June 4, 1946. H. NAGEL 2,401,367
COUPLING MEANS FOR CAMERA ATTACHMENTS
Filed March 22, 1945
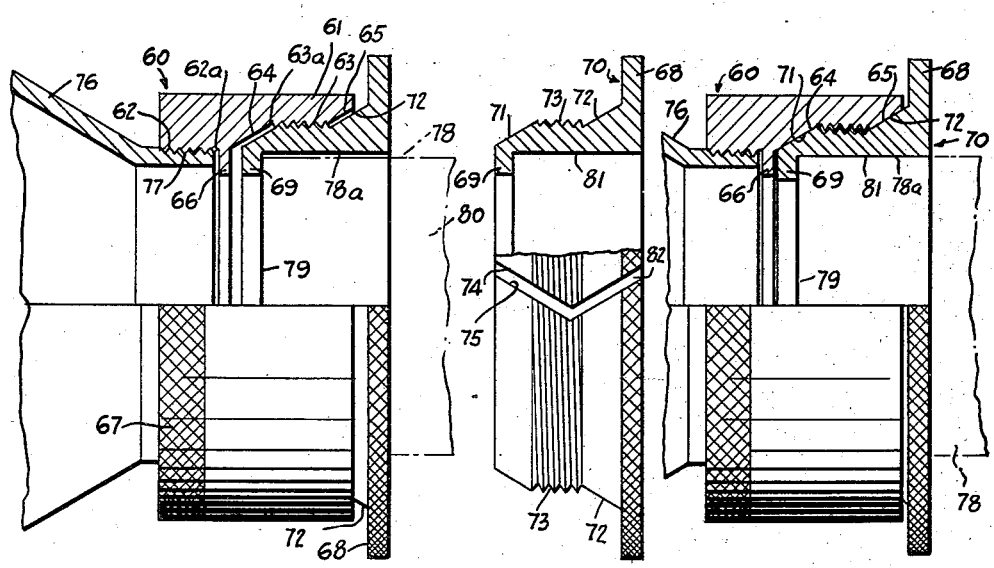
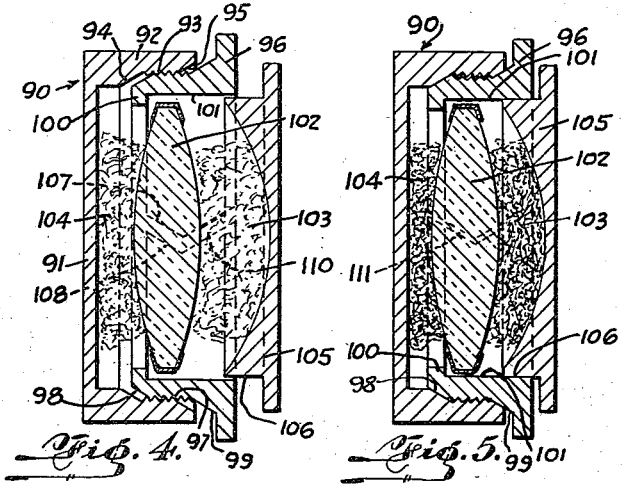
INVENTOR.
HENRYK NAGEL.

Patented June 4, 1946

2,401,367

UNITED STATES PATENT OFFICE 2,401,367

COUPLING MEANS FOR CAMERA ATTACHMENTS

Henryk Nagel, Bronx, N. Y., assignor to Practo Photo Accessories Corp., New York, N. Y., a corporation of New York Application March 22, 1945, Serial No. 584,143

6 Claims. (Cl. 88—1)

This invention relates to improvements in or relating to coupling devices, and more especially to devices which enable the connection and disconnection between parts of a camera or like instrument.

It is one of the objects of this invention to provide means for coupling parts of cameras and the like which means are inexpensive to manufacture, efficient and practical in use and operation, and easy in manipulation.

It is another object of the invention to provide means affording uniform, close and firm surface engagement with one part which is to be coupled to another part.

It is still another object of the present invention to provide adjustable coupling or attaching means fitted for being applied to or over a part or parts of various dimensions and assuring in adjusted or operative position on said parts equal, even and uninterrupted surface contact therewith.

It is a further object of this invention to provide means capable of frictionally engaging or embracing a relatively short and smooth, preferably cylindrical surface on which said means may be tightened, thereby permitting speedy coupling between mechanical parts, preferably of cameras, which parts may have different diameters with respect to one another.

Yet, a further object of this invention is to provide coupling means which are well adapted to fit standard constructions of lens barrels of cameras and to removably connect the latter with optical means, such as a light filter, lens shade, and other light regulating or conditioning means.

Still, a further object of the present invention is to provide a coupling device which may be used in connection with a camera as well as apart from the latter and may serve the purpose of receiving and holding a camera accessory and of forming a receptacle therefor with a lid, if so desired.

With these objects in view, the invention consists in certain features of novelty in the construction, combination and arrangement of parts by which the aforesaid and several other objects, hereinafter set forth, are effected, all as fully described with reference to the accompanying drawing.

In the drawing:

Fig. 1 is a side-elevational view of the coupling device made in accordance with this invention, illustrated partly in section and in inoperative position and applied to the lens barrel of a camera (indicated in dot-dash lines) to connect the latter with a lens shade, parts of which being broken away.

Fig. 2 is a side-elevational view, partly in section, of the sleeve member employed in the coupling device.

Fig. 3 is a view similar to that of Fig. 1 with the coupling device in operative position.

Fig. 4 is a longitudinal, sectional view through a receptacle with the sleeve member in inoperative position.

Fig. 5 is a view similar to that of Fig. 4 with the sleeve member in operative position.

Referring now in particular to the annexed drawing, there is disclosed a coupling device 60 having the sleeve member 70 and a tubular holding member 61. Holding member 61 has two inner threaded portions 62, 63 which both extend in horizontal direction but are positioned on two different levels 62a, 63a, respectively, as indicated in Fig. 1.

The ends of threaded portion 63 join respective inclined wall extensions 64, 65 which are directed in parallel relation with respect to each other. Holding member 61 has further the inner abutment or annular rim 66 and the outer gripping or knurled surface 67 which facilitates manipulation of holding member 61.

The aforementioned sleeve member 70 has the outer knurled flange portion 68 and the inner annular abutment or projection 69. Between knurled portion 68 and annular projection 69 there extend inclined outer surface portions 71, 72 which are directed in parallel relation with respect to each other, and further a cylindrical threaded portion 73 positioned between said surface portions 71 and 72. Sleeve 70 has the split ends 74, 75 having a substantially central projection and recess, respectively, and being of V-shaped formation which prevents lateral displacement of said ends 74, 75 relatively to each other and allows a certain guidance of said ends when said holding member is brought in engagement with said sleeve member. Said split ends thereby approach each other in circumferential direction of said sleeve 70.

As can be realized from Figs. 1 and 3, a lens shade, light conditioning or other optical implement 76 may threadedly engage at 77 the threaded portion 62 of holding member 61. In order to couple said implement 76, for example, to the lens barrel 80 of a camera, sleeve member 70 is slid over the surface 78 of said barrel 80 until the free end 79 of said barrel abuts against the inner rim projection 69 of sleeve member 70. If now the threaded portion 73 of sleeve 70 is brought into engagement with the threaded portion 63 of the holding member 61, the inclined surface portions 71 and 72 of sleeve member 70 will be forced against the inclined extension walls 64, 65, respectively, of the holding member and since the contact of said surface portions of said wall extensions will occur substantially simultaneously, the inner cylindrical surface 81 of sleeve member 70 will be pressed against the outer surface 78 of the lens barrel 80 while the distance between said split ends 74, 75 is reduced and said sleeve member 70 thus contacted to thereby frictionally engage by means of its inner wall 81 the surface 78 of the forward end of the barrel 80.

Thus, a smooth and uniform frictional pressure will be exerted along the contact surface 78 of the lens barrel 80 and the inner cylindrical surface 81 of sleeve 70. It is well understood that the approach of ends 74, 75 and the decrease of the space 82 will occur gradually but substantially equally. It will be further observed that by operating knurled portion 68 of sleeve member 70 in a direction for disengagement of the threaded portions 73, 63, speedy separation of implement 70 from the lens barrel 80 may be brought about.

It is obvious that sleeve 70 may be applied to various parts of cameras, etc., having different diameters to which the inner diameter of said sleeve may be modified and adjusted within small limits (several thousandths of an inch), thereby providing always an even and continuous surface contact therewith.

Fig. 4 depicts the application of the invention to a lens cap 90 having the closed bottom 91 and the circular wall 92. The inner surface of wall 92 has the cylindrical threaded portion 93 and the inclined portions 94, 95. Threaded portion 93 of cap 90 may be brought into engagement with sleeve member 96 having the inner threaded cylindrical portion 97 and the inclined surface portions 98, 99.

It is well understood that inclined wall portions 94 and 95 are disposed in parallel relation to each other and that surface portions 98 and 99 likewise extend in parallel arrangement to each other. Surface portion 98 terminates into inner projecting rim 100 which is adapted to abut against the forward end of the lens barrel whose opening is to be covered by cap 90. Upon threaded engagement of sleeve member 96 with cap 90, the inner cylindrical surface 101 of sleeve member 96 will frictionally embrace the lens barrel surface as explained hereinabove with reference to Figs. 1 and 3.

In the event that cap 90 together with sleeve member 96 is removed from said lens barrel, the cap-sleeve arrangement 90—96 may be employed to hold a lens 102, or a filter or like accessory. Lens 102 may rest between means, such as cotton pads 103, 104 or any suitable compressible and preferably absorbent means; while said cap-sleeve arrangement may receive a lid or closure 105.

Lid 105 is provided with a cylindrical projecting portion 106 with which inner surface 101 of the sleeve member 96 frictionally coacts to thereby tightly and securely close a receptacle formed by cap 90, sleeve member 96 and lid 105.

It will be seen from Fig. 5 that in the operative position in which sleeve member 96 threadedly engages cap 90 and is frictionally urged against surface 106 of lid 105, the cotton or like pads 103, 104 will be somewhat compressed, holding lens 102 or like accessory in protected and encased position within said receptacle.

It will be further noted that the distance 110 between the split ends 107, 108 of the sleeve member 96 is considerably reduced from the inoperative position, as exemplified in Fig. 4, to said operative position in which the distance between said split ends is designated by numeral 111, indicated in Fig. 5.

It will be observed that adequate contact between all inclined portions of the sleeve member as well as of the tubular member as illustrated in the embodiments of Figs. 1 to 3 is to be ensured so as to avoid distortion of the cylindrical shape of the sleeve member which would occur due to premature contact at one of its ends only. Therefore, the length of the inclined wall extension 64 must be equal to or greater than that of the inclined wall extension 65 and that of the inclined surface portion 71, whereas the length of inclined surface portion 71 must be equal to or smaller than that of the inclined surface portion 72 or of the inclined extension wall 64.

The horizontally directed threaded portions 63 and 73 must be of substantially equal lengths and the inclined wall extensions and inclined surface portions must be substantially parallel to each other.

It is well understood that any suitable material, such as metal, or non-metallic masses, such as plastic or plastic composition, may be used for the sleeve and/or tubular holding member.

The receptacle as shown in Figs. 4 and 5 may not only be used as a fitler box but may be applicable with certain variations to containers for use in jewelry and cosmetic industry.

It can thus be seen that according to this invention, there has been provided a device for coupling together two adjacent elements used in connection with cameras and other devices or instruments, comprising a tubular member for holding one of said elements, a sleeve member provided with an inner, substantially cylindrical wall to fit over said other element, a projecting ring portion forming one end of said cylindrical wall and an abutment for the end of said other element when said sleeve member is in engagement with said other element, said sleeve member being provided with an outer, horizontal threaded surface portion and with a tapered portion extending from each end of said threaded portion of said sleeve member, said tapered portions of said sleeve member being arranged substantially parallel to each other, said holding member being provided with an inner, horizontal threaded portion and with a tapered extension wall extending from each end of said inner threaded portion and being substantially parallel to each other, said tapered extension walls being pressed against said tapered portions of said sleeve member upon engagement of said threaded portion of said sleeve member with that of said holding member, said sleeve member being provided with spaced-apart split ends, whereby upon engagement of said sleeve member with said holding member the distance between said split ends is reduced and said sleeve member contracted to thereby frictionally embrace by means of its inner cylindrical wall said other element adjacent the one end thereof.

While there have been shown and described and pointed out the fundamental novel features of the invention as applied to the above embodiments, it will be understood that various omissions and substitutions and changes in the form and details of the device above described and illustrated and the operation thereof may be made

Having thus described the invention, what is claimed as new and desired to be secured by Letters Patent, is:

1. A device for coupling together two adjacent elements used in connection with cameras and like precision instruments, comprising a tubular member for holding one of said elements, a sleeve member provided with an inner substantially cylindrical wall to fit over said other element, a projecting ring portion forming one end of said cylindrical wall and an abutment for the end of said other element when said sleeve member is in engagement with said other element, said sleeve member being provided with an outer, horizontal threaded surface portion and with a tapered portion extending from each end of said threaded portion of said sleeve member, said tapered portions of said sleeve member being arranged substantially parallel to each other, said holding member being provided with an inner, horizontal threaded portion and with a tapered extension wall extending from each end of said inner threaded portion and being substantially parallel to each other, said tapered extension walls being pressed against said tapered portions of said sleeve member upon engagement of said threaded portion of said sleeve member with that of said holding member, said sleeve member being provided with spaced-apart split ends, whereby upon engagement of said sleeve member with said holding member the distance between said split ends is reduced and said sleeve member contracted to thereby frictionally embrace by means of its inner cylindrical wall said other element adjacent the one end thereof.

2. A device for attaching light regulating means to the lens barrel of a camera and for removal therefrom; comprising a tubular member for holding said regulating means, a sleeve member provided with an inner substantially cylindrical wall to fit over said lens barrel, a projecting ring portion forming one end of said cylindrical wall and an abutment for the end of said lens barrel when said sleeve member is in engagement with said lens barrel, said sleeve member being provided with an outer, horizontally directed threaded surface portion and with a tapered portion extending from each end of said threaded portion of said sleeve member, said tapered portions of said sleeve member being arranged substantially parallel to each other, said holding member being provided with an inner, horizontally directed threaded portion and with a tapered extension wall extending from each end of said inner threaded portion and being substantially parallel to each other, said tapered extension walls engaging said tapered portions of said sleeve member when said threaded portions of said sleeve member and of said holding member are in engagement with each other, said sleeve member being provided with spaced-apart split ends, whereby upon engagement of said sleeve member with said holding member the distance between said split ends is reduced and said sleeve member contracted to thereby frictionally embrace by means of its inner cylindrical wall said lens barrel adjacent said one end.

3. A device for attaching light regulating means to the lens barrel of a camera and for removal therefrom; comprising a tubular member connected with said regulating means, a sleeve member connectable with said lens barrel, a projecting ring portion on said sleeve member forming an abutment for the forward end of said lens barrel when said sleeve member is in engagement with said lens barrel, said sleeve member being provided with a horizontally directed threaded surface portion and with a tapered portion extending from each end of said threaded portion of said sleeve member, said tapered portions of said sleeve member being arranged at different levels, respectively, and being substantially parallel to each other, said tubular member being provided with a horizontally directed threaded portion engageable with said threaded portion of said sleeve member, a tapered extension wall extending from each end of said threaded portion of said tubular member, said tapered wall extensions being parallel to each other and engaging said tapered portions of said sleeve member when said threaded portions of said sleeve member and of said tubular member are brought into engagement with each other, said sleeve member being provided with spaced-apart split ends, whereby upon said engagement the distance between said split ends is reduced and said sleeve member contracted so as to effectuate connection between said lens barrel and said sleeve member by frictional engagement with one another.

4. A device for attaching one element to another element of a camera or like precision apparatus and for removal from one another; comprising a tubular member for holding one of said elements, a sleeve member connectable with said other element, said sleeve member being provided with an outer, horizontally directed threaded surface portion and with a tapered portion extending from each end of said threaded portion of said sleeve member, said tapered portions of said sleeve member being arranged at different levels and extending substantially parallel to each other, said holding member being provided with an inner, horizontally directed threaded portion engageable with said threaded portion of said sleeve member, a tapered extension wall extending from each end of said inner threaded portion of said holding member and parallel to each other, said tapered extension walls engaging said tapered portions of said sleeve member when said threaded portion of said sleeve member engages said threaded portion of said holding member, said sleeve member being provided with spaced-apart split ends, whereby upon engagement of said sleeve member with said holding member the distance between said split ends is reduced and said sleeve member contracted to thereby frictionally embrace said other element for connection therewith.

5. A device having one element for connection with another element and for removal from one another; comprising a sleeve member, said sleeve member being provided with an outer, horizontally directed threaded surface portion and with a tapered portion extending from each end of said threaded portion of said sleeve member, said tapered portions of said sleeve member being arranged substantially parallel to each other, said one element being provided with an inner, horizontally directed threaded portion engageable with said threaded portion of said sleeve member, a tapered extension wall extending from each end of said inner threaded portion of said one element, said tapered extension walls being parallel to each other and being engageable with said tapered portions of said sleeve member when said threaded portion of said sleeve member engages said threaded portion of said one element, said sleeve member being provided with spaced-apart split ends, whereby upon engagement of said sleeve member with said one element the distance between said split ends is reduced and said sleeve member contracted to thereby frictionally embrace said other element to bring about tight connection between said elements.

6. A receptacle having a cap-shaped element and a closure element therefor for connection with and for removal from one another, comprising a sleeve member, said sleeve member being provided with an outer, horizontally directed threaded surface portion and with a tapered portion extending from each end of said threaded portion of said sleeve member, said tapered portions of said sleeve member being arranged substantially parallel to each other, said cap-shaped element being provided with an inner, horizontally directed threaded portion engageable with said threaded portion of said sleeve member, a tapered extension wall extending from each end of said inner threaded portion of said cap-shaped element, said tapered extension walls being parallel to each other and being engageable with said tapered portions of said sleeve member when said threaded portion of said sleeve member engages said threaded portion of said cap-shaped element, said sleeve member being provided with spaced-apart split ends, whereby upon engagement of said sleeve member with said cap-shaped element the distance between said split ends is reduced and said sleeve member contracted to thereby frictionally embrace said closure element to bring about tight connection between said elements.

HENRYK NAGEL.